United States Patent [19]
Cortner, Jr.

[11] 3,902,461
[45] Sept. 2, 1975

[54] LIVESTOCK DUSTING BAG

[75] Inventor: William C. Cortner, Jr., St. Joseph, Mo.

[73] Assignee: Dale Alley Co., St. Joseph, Mo.

[22] Filed: Dec. 6, 1973

[21] Appl. No.: 422,341

[72] Continuation-in-part of Ser. No. 110,575, Jan. 28, 1971, Pat. No. 3,777,716.

[30] Foreign Application Priority Data
Nov. 27, 1973 Canada.................................. 186782

[52] U.S. Cl. ................................................. 119/159
[51] Int. Cl.² ........................................ A01K 29/00
[58] Field of Search................... 119/159, 157, 156

[56] References Cited
UNITED STATES PATENTS

| | | | |
|---|---|---|---|
| 3,364,900 | 1/1968 | Knapp................... | 119/158 |
| 3,821,940 | 7/1974 | Mann..................... | 119/159 |

Primary Examiner—Hugh R. Chamblee
Attorney, Agent, or Firm—Cushman, Darby & Cushman

[57] ABSTRACT

A self dusting cartridge loading protected livestock applicator comprising an inner porous bag having filling means and flexible protective material substantially surrounding and overly covering the bag. The flexible protective material extends below the inner porous bag forming folds which curl upward toward the bottom of the inner porous bag and preferably extend upward with a porous material that contacts and transfers dust from the inner bag to itself and to an animal. The applicator is constructed so that when it is agitated by an animal the guard or protective material cause dust to be dispensed on the agitating animal and at the same time provide some protection to the more vulnerable inner bag.

20 Claims, 21 Drawing Figures

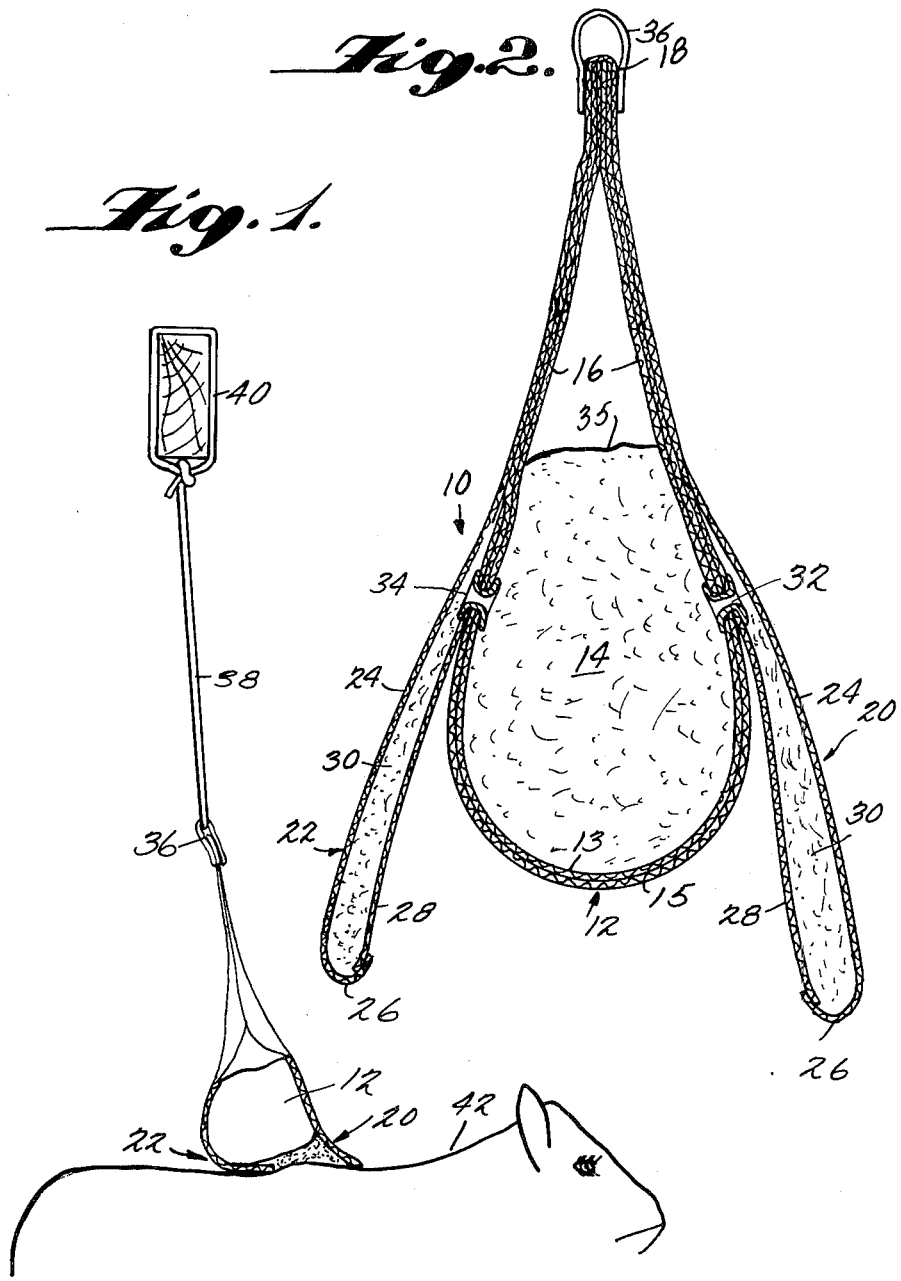

PATENTED SEP 2 1975 3,902,461

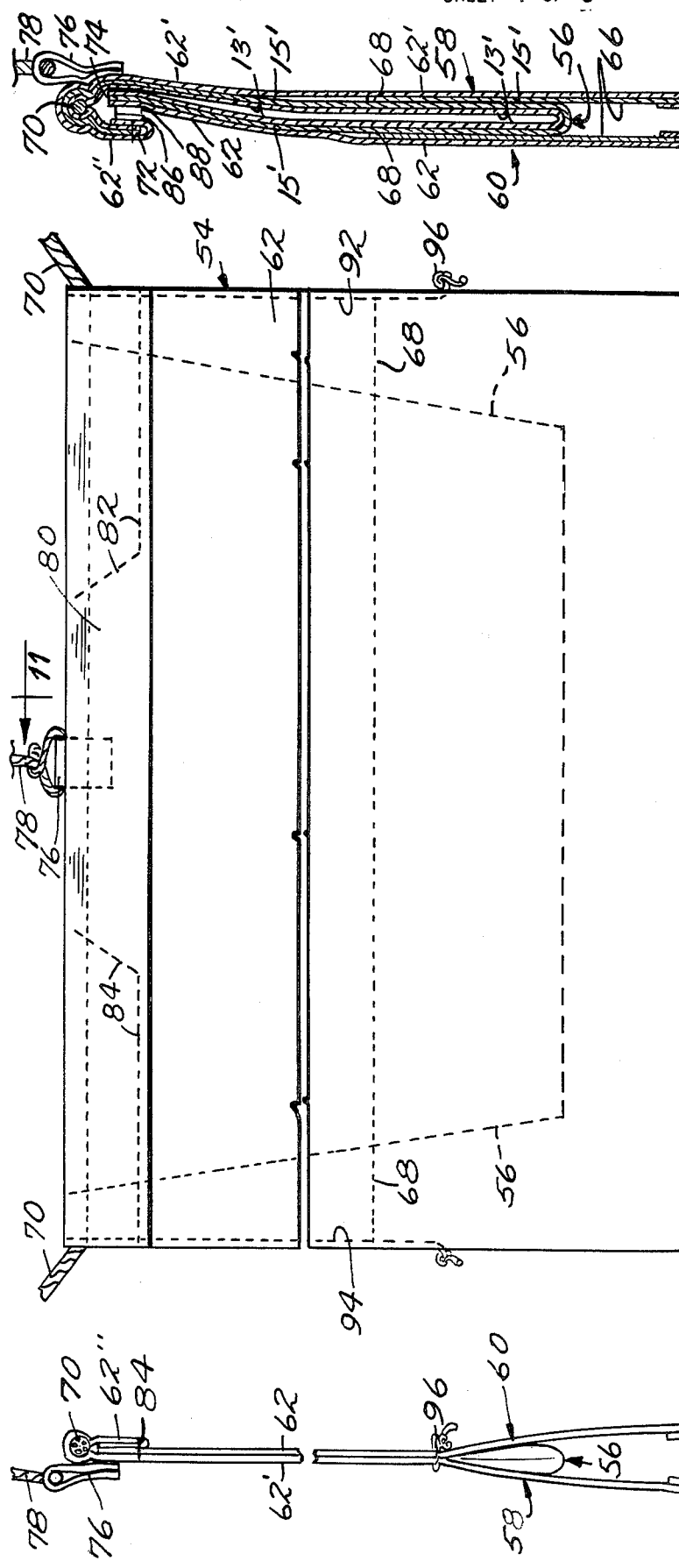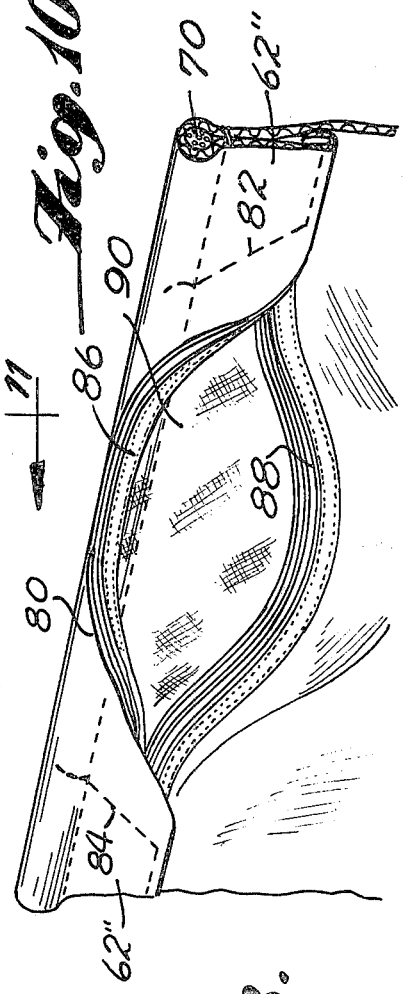

3,902,461

LIVESTOCK DUSTING BAG

This application is related to my co-pending application Ser. No. 110,575, filed Jan. 28, 1971, entitled Livestock Dusting Bag, now U.S. Pat. No. 3,777,716 issued Dec. 11, 1973.

This invention relates to an applicator for dusting livestock with insecticide powders or dust as the animal passes beneath the applicator.

It is well known that livestock are frequently troubled with various types of insects, such as flies, ticks, lice, grubs, etc., which prey upon them causing irritation which results in interference of the animals' grazing and feeding. This interference can result in a loss of weight, decrease the milk production or impairment of the hide.

In the past there have been several conventional ways this pest problem has been dealt with. One conventional way was to individually treat each animal by hand, which is an expensive method of treatment due to the individual cost of the labor involved. Additional treatments that have also been used are in the form of dust bags which are supported by various means. These dust bags are usually simple burlap type bags, or other more sophisticated bags that use poly type materials around the bag to protect them from moisture. The useful life of such bags has been limited due to the fact that the bag material has a tendency to easily become clogged with the dirt, saliva, feed and natural oils that accumulate on the bag when animals come into contact with them.

The invention in my aforesaid copending application overcame the prior art problem as does the present invention which includes some of the same features. Both are improvements over previous dust applicators and each is constructed with an outer layer of heavy flexible material substantially encompassing and overly covering an inner porous bag so that the edges of the outer heavy flexible material extend down and under the inner porous bag forming folds. The fold arrangement acts as a protective guard in two ways.

1. It protects the more vulnerable inner dust carrying bag from the abuse of the cattle agitating the bag and also absorbs or collects much of the foreign matter from the cattle preventing the foreign matter from plugging the porous inner dust carrying bag.

2. It offers protection of the inner dust carrying bag from the elements and due to the heavy outer cover, the inner dust carrying bag is in a sense hanging in deep shade and the sun's ultra violet penetration is greatly reduced. This configuration also offers excellent protection from wind and moisture.

Preferably, the heavy flexible material outer bag cover is lined in the inside from the bottom up for at least part of its height with porous material for receiving and also applying dust to the using animal. This outer bag cover has the feature of exposing a greater dusting area when agitated.

The normal use of the present invention like that in my aforesaid application lends itself to a longer serviceable life than a conventional applicator or bag which comes into contact with moisture, dirt and other clogging materials, as well as the ultraviolet rays of the sun, causing it to rot. Consequently, the improved construction and material composition enable it to be used longer than conventional dust bags. In fact, dust bags made according to the disclosure herein can be reused, as a refilling means is provided for the inner dust bag of the applicator which allows the user to conveniently refill the bag, thus lowering the cost per pound of dust dispensed.

The present invention disclosed herein that is unique over that in my aforesaid application relates to a similar type of livestock dusting applicator but either has a top loading facility or is of a saddle type or of cone shape. In the top loading type, a portion of the rear outer cover, that securely hangs over a rope and overlap the front cover, is operable for filling purposes and reclosable. In the saddle type two covered bags hang over a rope like a saddle and either can be thrown or inverted over the top of the rope to expose access openings to both bags. In the cone shaped embodiment, the outer bag is of cone shape and its inner bag is of cylinder or cone shape with the inner bag including strap means connecting its top to its central bottom to pull the latter upward and prevent sag thereof. The top of the inner bag is preferably open for filling purposes and closable with a draw string, and its strap means removably connect interiorly at its apex to hanging means of the outer bag. The hanging means sealingly extend through the apex of the outer bag and provide for a single hanging point.

There are many objects and advantages to this new structure over the prior art and my prior structure which is redescribed below relative to FIGS. 1–9. These objects and advantages will become more apparent from the following detailed descriptions in connection with the accompanying drawings, in which:

FIG. 1 shows my prior embodiment of a hung self-dusting livestock applicator, partially diagrammatic and partially in cross-section, being agitated by an animal to release the dust upon the animal;

FIG. 2 shows an enlarged cross-sectional view of the self-dusting livestock applicator of FIG. 1;

FIG. 10 is a front side elevational view of the top loading bag;

FIG. 11 is a cross-sectional view taken along the lines 11—11 of FIG. 10, with cross hatching being regular for convenience sake in reading the figure;

FIG. 12 is a left end view of FIG. 10;

FIG. 13 is a perspective view of a portion of FIG. 10;

Figure 3:
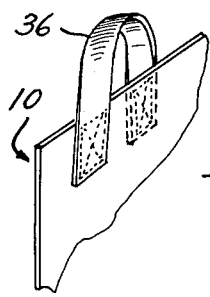
FIG. 3 is a perspective view of the self-dusting livestock applicator shown in FIG. 1.
Figure 3A:
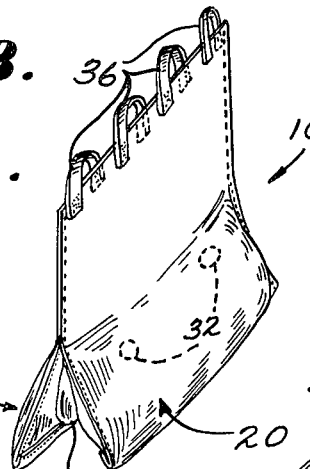
FIG. 3a is an enlarged view of a portion of FIG. 3 and shows the strap detail.
Figure 3B:
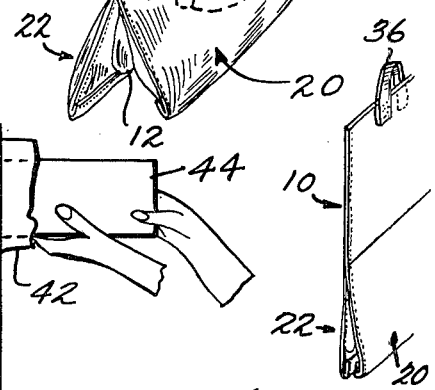
FIG. 3b is a partial view of FIG. 3 and shows how the guard flaps conform back to the vertical after agitation by livestock.

A first embodiment of my cartridge loading livestock dusting bag or applicator 10 as described and claimed in my aforesaid prior copending application and in FIGS. 1, 2 and 3 includes an inner porous dust storing and dusting bag 12, and as shown is filled with insecticide dust or powder 14. Preferably, bag 12 comprises two porous layers 13 and 15, for example two layers of burlap, or one inner layer 13 of burlap and an outer layer 15 of porous plastic such as a polyester netting woven material preferably of the kind that is nonstretchable so that it will not sag when filled. Bag 12 is closed at both ends and its sides 16 extend upwardly toward each other to a closed top end 18. With this arrangement, several important advantages are obtained. First, the inner layer 13 of burlap carries little or no weight of the dust 14 since it is supported by the outer layer 15. Second, the burlap layer 13 or layer 15 does not come into contact with the saliva, feed, water, dirt, hair and oils or other foreign material from the cattle which ordinarily would result in clogging of the burlap layer as the outer guard flaps protect them.

The inner bag 12 is fully protected from weather by two guard flaps 20 and 22 on opposite sides of bag 12. As indicated in FIG. 3, these flaps not only fully cover both sides of bag 12 but also extend substantially beyond the opposite ends of the bag to effect a substantial cover of bag 12 all the way around. Flaps 20 and 22 includes an outer wall 24 which is of flexible material, for example, cloth, burlap if desired, covered with a suitable heavy flexible material. Outer wall 24 may likewise be made of waterproof canvas or duck (e.g. 8 oz.) material which is durable, rugged and can withstand the beating normally given it by livestock. Each outside wall provides skirt means which extends considerably below the bottom of bag 12, for example a distance about equal to one-half the maximum width of bag 12 when filled, and at its lower end curls inward and upward to nake a U-shaped drip cap 26 for keeping moisture and foreign matter away from the inner bag 12. That is, any moisture on outer wall 24 runs down the wall and drips off at its lower end 26, thereby preventing moisture from coming into contact with bag 12 during use of the dust applicator 10 by wet livestock as shown in FIG. 1.

Flaps 20 and 22 preferably include an inner wall 28 forming each flap into an outer bag the ends of which are sewn shut or otherwise secured together and the interior of which also contains insecticide dust 30, which may be transferred thereinto from bag 12 in either or both of two ways. For example, direct, open transfer channel means such as grommets 32 and 34 may be disposed through apertures in opposite side walls 16 of inner bag 12 and respective inner walls 28 of the outer bags 20 and 22, approximately half way between the bottom of bag 12 and the normal fill level 35 of dust 14 therein. Of course, there may be more grommets per side than the two grommets 32 shown in FIG. 3. In addition to such grommet transfer means, or instead therof, inner walls 28 may each be made of porous material, such as burlap cloth, whereby transfer of dust from the inner storage bag 12 to the guard flaps or outer bags 20 and 22 takes place automatically upon contact between bag 12 and the inner walls 28 during use of applicator 10.

As more particularly shown in FIG. 2, outer wall 24 also extends upwardly along side walls 16 of bag 12, and forms a protective top cover, with the inner and outer bag walls being secured together in any desired manner, as by several straps that also provide the means for the complete assembly to be hung with a rope from an over head structure. These straps are staggered in their attachment to opposite sides of the bag so that each single strap offers two bearing points. In the case of four straps, eight bearing points are effected and dispersement of weight is reduced per bearing point and the weight of the hanging bag is evenly spread the length of the protective top.

As above indicated, burlap cloth is a preferable porous material for inner layer 13 on inner bag 12 and inside flap walls 28, but, of course, any other porous material may be used as long is it will sufficiently convey the powder or dust to the animal. Any desirable heavy flexible material can be employed on the outer walls 24 (guard flap 26).

In operation, dust applicator 10 is hung so that the lower guard flap ends 26 are 6 to 8 inches below the back line of the animal 42 to be dusted. As the animal passes under the applicator, contact is first made with the flexible outer side 24 of the leading flap 22, pushing the inner side 28 thereof against the inner bag 12 which contains the insecticide dust. This transfers dust into bag 22 via grommet 34 if such exists and/or via the pores in bag 12 and side wall 28 (if the latter is porous as is preferred). As the animal passes on under the applicator, contact is made with the inner wall 28 of the other guard flap or outer bag 20, and assuming that it has already been charged with dust, and since it hangs below the bottom of the inner bag 12, it drags across the head and back line of the animal, dusting as it passes. During this process, dust is also emitted from the inner bag 12 directly onto the animal. In use, the combination of the exposed dusting area of the inner bag and the guard flap dusting walls 28 have a greater exposed dusting surface and consequently a greater efficiency and a better dusting potential, than a conventional bag, since the side flaps or bags of the present invention are constantly being charged and emitting dust along with the main bag 12. Dusting of an animal is also accomplished when it stands besides the bag and bucks and tosses it with its head. It will be realized that the arrangement of the dust bag of the present invention protects the bag 12 from much of the stress and wear resulting from animal contact since, as most blows from the animal's horns or head are usually directed upwardly, the guard flaps 20 and 22 will conform to the bottom side of the dust bag 12 and absorb the blows from the animals. Moreover, as shown in FIG. 1, when an animal passes under the dust bag, the leading guard flap first comes into contact with the animal and folds under the dust bag 12 to absorb most of the oil, dirt and other clogging materials and functions to keep the dust bag 12 out of contact with the animals.

In an embodiment wherein grommets 32 and 34 are employed, two or more such transfer grommets being preferably used on each side of the bag, the outer dust flaps 20 and 22 are immediately charged with the dust 14 inside bag 12 upon hanging of the applicator in place. As the top level of the dust drops below the grommet level, the lifting action caused by livestock using the applicator raises the bottom level of the dust allowing the transfer grommets 32 and 34 to function until almost if not all of the dust is used.

If desired, the weatherproof dust bag of this invention may be used as a throwaway item. That is, once its contents have been used, a new bag may be hung in its place.

Figure 4:
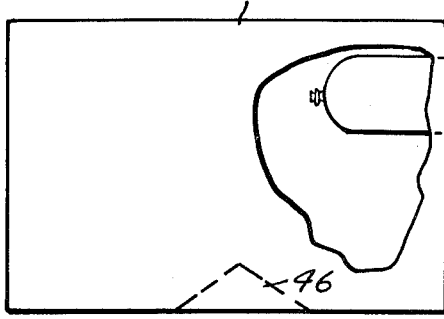
FIG. 4 is a partial cutaway side view of an inner dust bag of the self-dusting livestock applicator of FIG. 1, showing insertion of insecticide cartridges into the inner dust bag.
Figure 5:
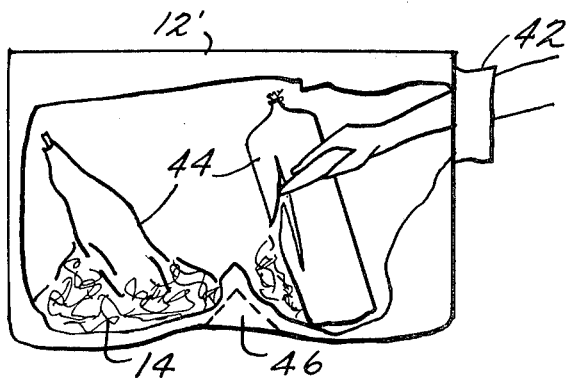
FIG. 5 is a partial cutaway side view of the inner dust bag of FIG. 4 showing the perforation of the insecticide cartridges inside the inner dust bag.

Alternatively, since the protection provided by this invention gives the applicator 10 a much longer serviceable life than a conventional bag that rots from moisture and the ultraviolet rays of the sun, refill provisions are desirable. As shown in FIGS. 4–9, inner bag 12' has a flexible filler valve or spout 42 through which insecticides may be inserted. This bag can be filled at the dusting location, with an insecticide dust cartridge 44 being inserted into the bag through spout 40. The dust applicator may be shipped with or without one or more insecticide cartridges. FIG. 4 shows the insertion of one such cartridge into bag 12' and when the operator needs to use the dust applicator, he reaches through the spout 42 and punctures or slits the cartridge or cartridges as shown by FIG. 5. Dust or insecticide then spills out into the applicator and the action of the animal bumping the bag will cause the contents thereof to be dispensed during the self-dusting operation by the animal.

When more than one cartridge 44 is used, as shown in FIG. 5, the middle bottom portion of bag 12' is preferably sewn in a manner to cause a V void 46 to remove weight from center of bag. This eliminates sagging of the dust bag in the center causing the bottom to be level.

Figure 6:
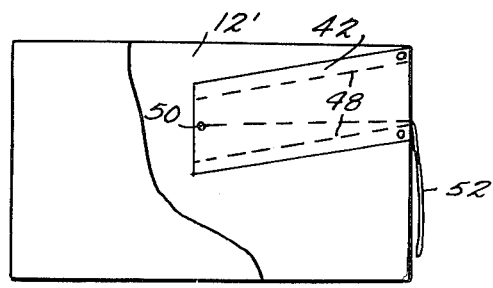
FIG. 6 is a partial cutaway side view of an inner dust bag showing the filler valve tucked inside before filling.
Figure 7:
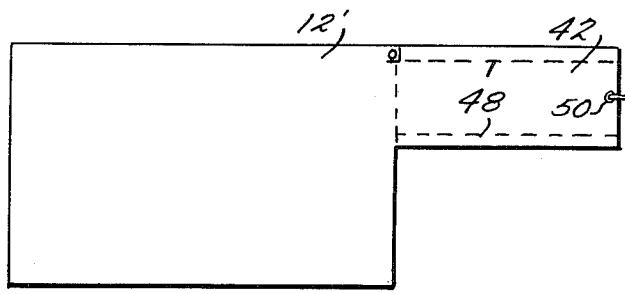
FIG. 7 is a side view of the inner dust bag of FIG. 6, showing the filler valve pulled out for filling purposes.
Figure 8:
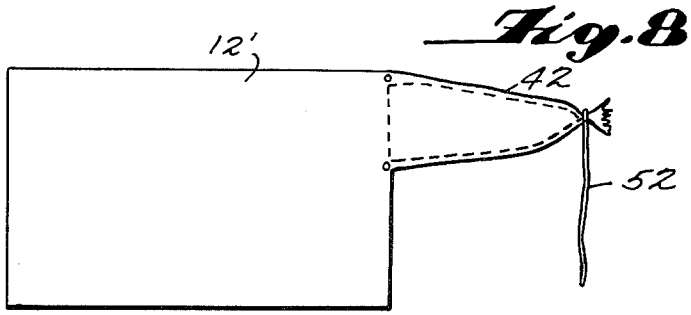
FIG. 8 is a side view of the inner dust bag of FIG. 6 showing the filler valve tied after filling.
Figure 9:
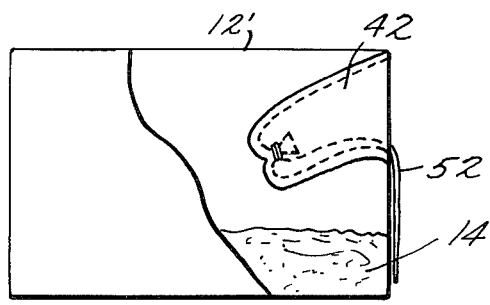
FIG. 9 is a partial cutaway side view of the FIG. 6 bag showing the closed filler valve inserted in the inner dust bag after the bag has been filled with insecticide dust.

FIGS. 6 and 7 show the details of the filler valve or spout 42 with its support stitching 48, eyelet 50 and valve tie cord 52. When the bag is filled with an insecticide cartridge the inner bag 12' is closed as shown in FIG. 8 by tying the valve tie cord 52 around the ends of the filler valve or spout 42 and then the valve is pushed inside the bag with the pull cord 52 hanging outside thereof if desired, as shown in FIG. 9. Any other type of closure means may of course be utilized to close the end of the filler valve or spout 40.

FIGS. 10, 11, 12 and 13 show a new embodiment of my unique livestock dusting bag or applicator 54. This particular embodiment is of the top-loading type, as will become more apparent from the description given below.

This embodiment also includes an inner porous dust storing and dusting bag 56, which as in the case of FIG. 2, is also preferable made of two porous layers 13' and 15', for example two layers of burlap, or one inner layer 13' of burlap and an outer layer 15' of porous plastic such as polyester netting woven material preferably of the kind that is non-stretchable so that it will not sag when filled with insecticide dust or powder 14. Bag 56 is closed at both ends and across its bottom, for example by stitching with the stitching preferably being on the inside, i.e., with the edges of the opposite sides of the inner bag turned inwardly at each end and across the bottom and sewn together on the inside.

As in the case of the FIG. 1 embodiment, the inner bag 56 in the FIG. 10–13 embodiment is fully protected from weather and from use and abuse by livestock by the outer guard flaps 58 and 60 which fully cover the opposite sides of the inner bag 56 the outline of which is shown by dotted lines in FIG. 10. That is, these guard flaps not only fully cover both sides of bag 56 but also extend substantially beyond the opposite ends of the inner bag to effect a substantial cover of the bag all the way around. Furthermore, flaps 58 and 60 extend as skirt means downwardly below the bottom of bag 56, preferably at least to the extent of half the width of bag 56 when it is full of dusting powder. The cross-sectional view in FIG. 11 does not show the bag containing powder. The outer guard flaps 58 and 60 include respective front and rear outer walls 62 and 62' which are of flexible material, for example, cloth, burlap if desired, covered with a suitable heavy flexible material. Outer walls 62 and 62', as well as outer wall 24 in FIG. 2, may be made of waterproof canvas or duck (e.g., 8oz. material) which is durable, rugged and can withstand the beating normally given such a dust applicator by livestock. Of course, the outer walls 62 and 62' are waterproof, and preferably have their bottom edges 64 turned inward and upward to form a hem which is stitched, and which also provides for better water dripping as previously discussed relative to FIGS. 1 and 2. In like manner the side edges are also preferably hemmed.

The inside of each of the outer guard flaps 58 and 60 is lined with a porous material 66, for example, burlap, at least for a distance from the bottom edges 64 up to about the mid-height of the outer walls 62 and 62', to which they are respectively sewn or otherwise secured as indicated by the front and rear stitching lines 68.

From FIGS. 11 and 12 in particular, it will be noted that the outer walls 62 and 62' extend upwardly beyond the burlap lining 66 and stitching lines 68, with the outer or rear wall 62' extending along with the rearward sides of the inner bag 13' and 15', upwardly and over a horizontally extending portion of hanging rope 70. These three pieces continue around the rope and extend downwardly on the opposite side with the outer cover portion 62" being hemmed and stitched as at 72.

The front side outer cover 62 and its adjacent inner bag layers 13' and 15' do not extend all the way to rope 70, but only to a height as generally indicated by the numeral 74.

Sewn or otherwise secured to the center of the upper rear side of the outer covering 62' is a loop 76 which is optionally employed with a hanging rope 78 to help prevent sag of the dusting bag when it is otherwise hung by rope 70 at its opposite ends.

As previously indicated, the embodiment in FIGS. 10–13 is of the top loading type, and this is accomplished by a portion 80 of the front top cover 62" being openable as shown more clearly in FIG. 13. That is, as indicated by the stitching 82 and 84 on opposite sides of the top 80 portion of the overlaped front cover 62", the stitching 82 and 84 securely holds the right and left ends (as viewed in FIG. 10) of top 62" securely from the front through the rear cover 62', but leaves the section 80 to be openable. Section 80 is opened merely by lifting its bottom upward, when it is otherwise held closed by pressure adhering materials such as the two strips 86 and 88, which may be "Velcro" such as disclosed in Mestral U.S. Pat. No. 2,717,437 or any other well known pressure adhering fabrics which may be readily separated manually. Other suitable fasteners may be employed if desired. In any event, when section 80 is opened as shown in FIG. 13, an opening 90 appears giving access to the interior of inner bag 56, and consequently the bag may be filled with insecticide or dusting powder in any desirable way, such as insertion of a cartridge and splitting thereof as discussed above relative to FIG. 5. When the bag is sufficiently filled, flap 80 is pressed downward and the fasteners 86 and 88 again seal the bag.

From FIGS. 10 and 12 it will be noted that the opposite ends of the outer covers 62 and 62' are fastened together from the top downward to a point below stitching line 68, i.e., to a point between about for example one-half and two-thirds of the way downward by stitching 92 and 94 the threads of which are tied in respective knots 96. This protects the inner bag 56 from weather, etc., from opposite ends, and this stitching at its upper ends also crosses rope 70 as does stitching 82 and 84 which help secure that rope in a desired longitudinal position. Knots 96 secure the threads of stitching 92 and 94 together strongly enough so that the flaps as they freely extend below the knots will not tend to break the stitching 92 or 94 but retain the closed upper ends of the outer covers.

Figure 14:
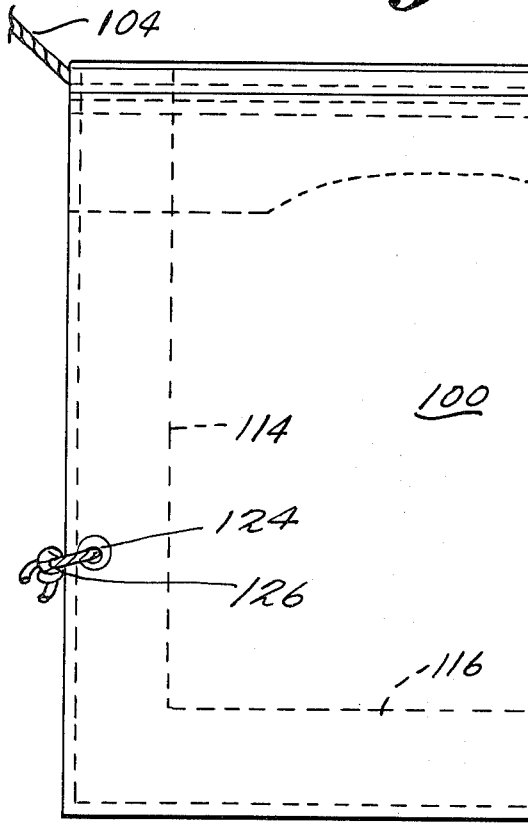
FIG. 14 is a side elevational view of the saddle type bag.
Figure 15:
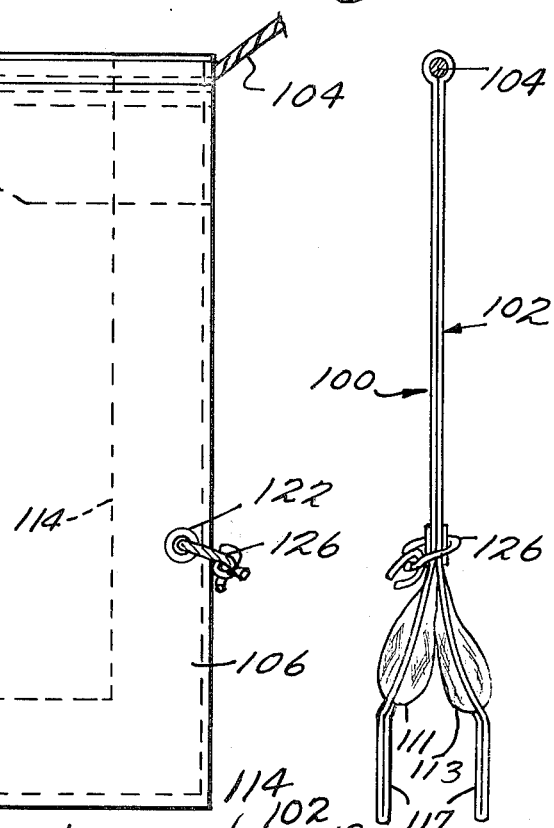
FIG. 15 is an end view of the FIG. 14 bag.
Figure 16:
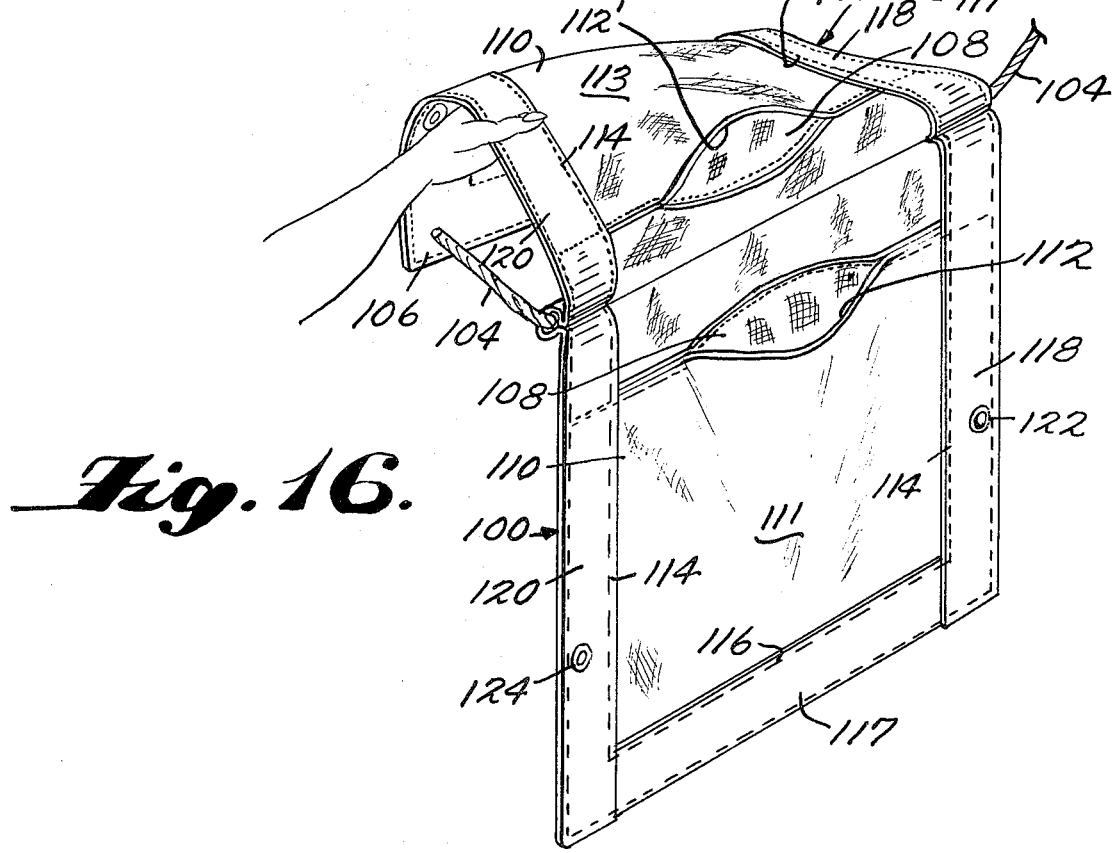
FIG. 16 is a perspective view of the FIG. 14 bag with one side being inverted up and over the rope.

Another embodiment of this invention is shown in FIGS. 14–16, and is generally referred to as the "saddle bag" type since it is comprised of two sides 100 and 102 connected at their top to and over a hanging rope 104. Each side has an outer cover 106 that is a single piece which extends from the bottom of one side to its top and over rope 104 and down to the bottom of the other side. Cover 106 is of the same material construction as outer walls 62 and 62' described above relative to FIGS. 10–13. Additionally, each vertical inside wall of cover 106 is lined with a material 108, preferably porous such as burlap as in the other embodiments, and a second layer of porous material 110, again preferably burlap or the aforesaid polyester netting, forms with the lining 108 respective inner bags 111 and 113 which have openings 112 and 112' at their upper ends. As apparent from FIGS. 14 and 16, the stitching 114 along the sides of the inner bags 111 and 113 and stitching 116 along the bottom thereof leave a margin or border for protective purposes. The lower inside border 117 consequently extends upwards to the bottom of the respective inner bag 111 or 113. Disposed in the side or end borders 118 and 120, are respective grommets 122 and 124. As shown in FIGS. 14 and 15, when both sides of the bag are down in operable position, a side tie rope 126 is employed to keep the opposite sides 100 and 102 together.

When it is desired to fill either or both sides 100, 102, one of those sides is lifted up and over the rope as shown in FIG. 16, so as to expose their respective filling openings 112 and 112', into which insecticide powder or dust may be deposited directly or by a cartridge slitting manner as discussed above relative to FIG. 5. When the sides are both filled to the desired extent, the side which had been flipped over the rope is returned back to its normal position as shown in FIG. 15, and ropes 126 are retied on both sides. Openings 112 and 112' will automatically reclose themselves by mere pressure against one another, though if desired a closure or fastener may be employed especially if loss of dust through the openings becomes a problem. That is, for example pressure adhering fabrics such as 86 and 88 in FIG. 13 or any other type closure may be used.

In the saddle type dust bag of FIGS. 14–16, the two inner bags 111 and 113, one on each inside wall of the outer cover 106, hang or saddle over the sewed-in top hanging rope 104. This construction affords a safety feature, as two separate bags are incorporated. That is, if one side or bag fails, the assembly is still functional. Use and operation of this saddle type bag are similar to that described above for the other embodiments.

Figure 17:
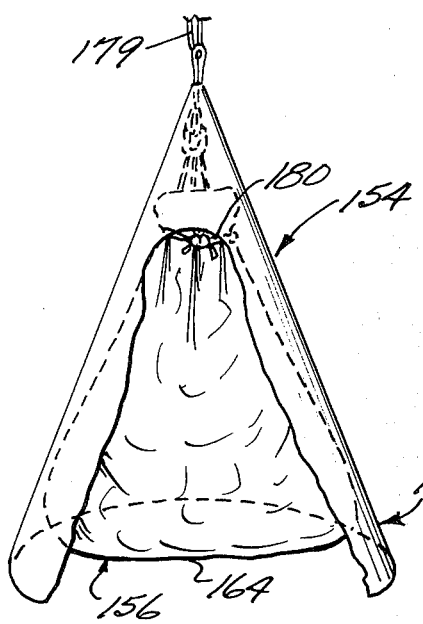
FIG. 17 is a partially cutaway pictorial view of another embodiment of the invention showing an outer cone-shaped protective bag and an inner cone-shaped dusting bag.
Figure 18:
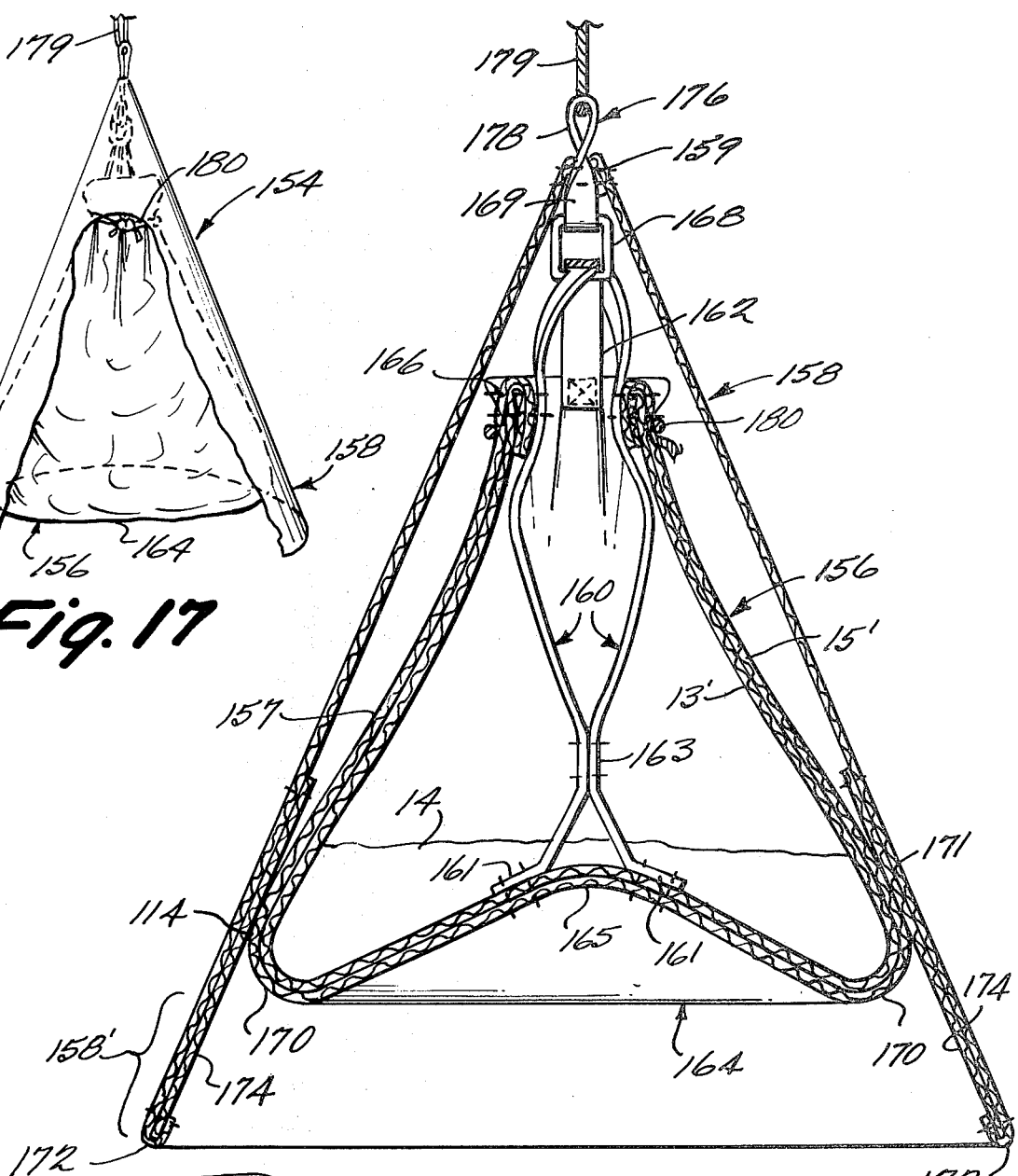
FIG. 18 is a cross-sectional side view of the embodiment of FIG. 17 showing the manner of connection between the inner and outer bags and the support straps.
Figure 19:
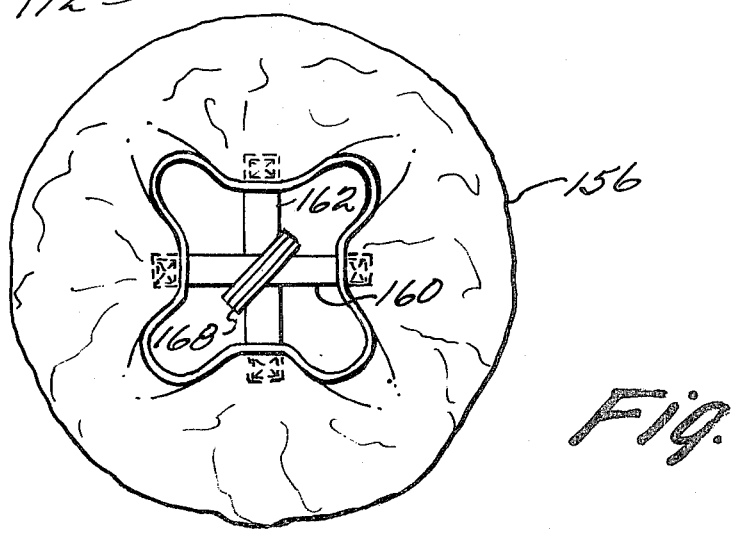
FIG. 19 is a top plan view of the inner cone-shaped dusting bag of the embodiment of FIG. 17 showing the support straps.

The new embodiment of my unique, cartridge loading livestock dusting bag or applicator 154, as shown in FIGS. 17, 18 and 19, includes an inner insecticide storing and dusting bag 156 filled with an insecticide dust or powder 14, and having an outer protective bag 158 generally cone-shaped in configuration.

The inner bag 156 may be made from a single layer of burlap fabric or similar porous type of material or it may be made of two porous layers such as described above relative to layers 13 and 15 of FIG. 2. Bag 156 has a circular bottom 164 with a diameter that is preferably but not necessarily large enough to dust an area at least the width of the animal to be dusted. An exemplary diameter is 18 inches. The side portion 157 can be cylindrical or cone-shaped as long as it can be drawn into the upper portion of the outer cone-shaped bag 158. The bottom 164 and side portion 157 can be secured together by any suitable means such as sewing or may be made as one piece in any desired manner.

Referring more particularly to FIG. 18, the inner bar 156 is supported by strap means 160 and 162 which are sewn to the inside of the inner dust bag 156. The strap means 160 is attached to the bottom portion 164 of the inner bag 156 at two points 161 slightly away from the central area 165 of the bottom. The strap means 160 then extend upwards as hump shaper straps and are sewn together approximately at the center portion 163 of the inner bag 156 and continue to extend upwards toward the open end of the inner bag and are sewn to the inside of the upper portion 166 at opposing sides of the inner bag and then extend out through the upper portion and are attached to a ring 168. Strap means 160 is preferably a single strap that extends from the central bottom area 165 of the inner bag to one side of the top 166 thereof, through ring 168 to the opposite side of top 166 and back down to the central bottom area 165. Strap means 162 on the other hand is a short loop starting and ending at the upper portion 166 of the inner bag, being sewn thereto on either the inside or outside but displaced 90° from the upper portions of the strap means 160 so as to evenly support the inner bag 156. The strap means 162 extends upward out of the top portion 166 of the inner bag in the same manner as strap means 160, and is connected to the ring 168 to thereby support the inner bag.

Ring 168 is preferably of the split-ring side-overlap type instead of being a continuous solid square ring. That is, the ring is split in two but its opposite ends overlap in a spaced side-by-side manner as shown in FIG. 19. This allows each of the straps 160 and 162 to be pre-sewn to the inner bag 156 and slipped into ring 168. The ring can also be slipped into the inner loop 169 of the hanging strap 176 which is sealingly secured to the apex of the outer bag 58 as more fully discussed below. This manner of coupling allows a user to replace the inner dusting bag or the outer protecting cover if one or the other has some additional use life left, obviously affording a savings as compared to purchasing a totally new bag.

The manner in which the straps 160 and 162 are sewn to the inner bags 156 causes the central bottom area 165 to be lifted up in relation to the outer edges 170 of the bottom 165 so that when the inner dust bag is filled with an insecticide, dust or powder 14, the powder will lay, as seen from the bottom at least, in a generally ring or doughnut-shaped configuration about the center 165 of the inner dust bag 156. That is, strap assembly 160 is a shaper strap that pulls up the inverted cone 165 in the bottom of the inner bag 156 causing the dust contents to shape itself into a ring. Since strap 60 also attaches to the top of the dust bag, it helps stabilize the whole dusting bag applicator. Straps assembly 162 is also a stabilizer which along with strap 160 causes the dust bag to hang level. The effect of the dusting ring is to cause the inner bag to maintain a substantially increased dusting area since the powder 14 is forced to the outer edges of the bag 156, thus expanding it. This gives the total assembly the capacity to "block" lanes or doorways through which livestock are moved and hence forced to use the duster.

Straps 160 and 162 cause not only two attachment points at the bottom of the inner dust bag making the void possible but also attach at four points separated 90° around the top which allows the inner dust ring to maintain a horizontal position with the ground. Also the four point attachment eliminates the dust from shifting from one side of the bag to the other which would cause a rupture effect and is undesirable.

The outer cone-shaped protective bag 158 has an annular guard or skirt portion 158' which extends below the inner bag bottom 164 up to at least half the diameter of the bag bottom 164 to help operate on the livestock as shown in FIG. 1. A suitable lesser length for skirt 158' may be 4 or 5 inches for an 18 inch diameter of inner bag bottom 164. As shown, outer bag 158 includes an outer wall 171 which is inwardly and upwardly turned at its lower edge portions 172 to provide drip means. This prevents water which would otherwise accumulate on the lower inner portion or wall 174 of the protective outer bag 158 from causing moisture to be transferred to the inner bag 156 and thereby substantially preventing the flow of insecticide out of the bag because of a caking and hardening of the insecticide in the porous material from which the inner bag is constructed. The outer wall 171 may be constructed of the same material as outer wall 24 in FIG. 2. The inner wall or portion 174 of the outer cone-shaped bag 158 preferably is a lining of burlap or similar porous material like inner wall 28 of FIG. 1 and is sewn at its upper and lower edges to the outer bag and positioned so as to rub against the inner bag 156 thereby causing increased agitation of the material which causes a greater dispensing of the insecticide 14 as with the first mentioned embodiment. In addition, this inner portion 174 accumulates insecticide 14 and distributes it on an animal moving under the bag and thereby also increases substantially the area covered by the insecticide. Of course, the inner wall portion 174 may be extended to the full height of outer wall 171 if desired.

The outer bag 158 is sewn at its upper portion or apex 159 to a hanging strap means 176 which interiorly includes loop 169 attached to an opposite side of the ring 168 from that of the inner bag 156. The hanging strap means 176 extends through a tightly sewn and hence weatherproof sealed opening at the apex of the outer bag 58 and provides an exterior loop 178 from which the cone-shaped livestock dusting bag 154 can be supported at a single point as by rope 179. Of course, if desired, the hanging strap 176 may be two straps separately sewn to the inside and outside of bag 158.

In addition to the above-described features of the cone type dusting bag shown in FIGS. 17-19, it has similar advantages to the previously described embodiments, such as being refillable, easily loaded while suspended in position, and allows the use of the cartridge filled with insecticide as may be utilized with other embodiments.

Furthermore, however, the cone-shaped dusting applicator of this invention provides a larger assembly in general than a corresponding bag of the FIGS. 1–10 type since the cone bag is symmetrical from any point of view, so that when it is hung in the open it is more noticeable to livestock and presents a larger object to butt or work. The larger bottom diameter also exposes more surface dust dispensing area, while still being completely protected from moisture, wind and sun since the cone covering bag 158 extends substantially below the inner dust carrying bag 156. Also, only one hanging rope is necessary for the cone type bag, which is not only a savings from the standpoint of labor but also as to material. Further, it provides for fast and easy installation and eliminates any need for a level handing arrangement.

It is also to be noted that in the single point attachment structure of the cone type applicator the strap attachment takes all the weight of the inner bag 156 even though the straps pass through the outer protective cone bag 158 and does so in such a manner that a positive weather seal is maintained without transferring any of the weight to that outer bag 158.

As previously explained, inside the protective cone cover 158, the strap attachment structure 169 is connected to the straps 160 and 162 of the inner bag 156 by a detachable split metal ring or square coupler 168. This arrangement of the attachment assembly including the straps and split square coupler 168 causes the inner dust bag 156 and outer cover 158 to become independent of each other if necessary. Hence in the case of excessive wear of the inner bag or outer cover, a replacement thereof can be installed. An alternative arrangement to use of the metal ring 168 and interior loop strap 169 is to sew straps 160 and 162 directly to the outer cone cover 158, for example to the inside thereof with the exterior hanging loop 178 remaining or alternatively one or both straps 160 and 162 can be sewn through the apex of the outer cover 158 and form the outer hanging loop means instead of the separate strap hanging assembly 176. Of large importance in any case is the fact that any of the arrangements allow for top loading of the inner dust bag, as now explained, though of course the direct sewn strap arrangement does not allow for ready replacement of the inner bag or outer cover as does ring 68.

To load the inner bag 156, the outer cover is lifted up out of the way. Then draw string 180, which surrounds the top of inner bag 156, is untied and the top is opened up by pulling the two nearest parts of the straps 160 and 162 in opposite directions through square coupler 168. This causes the largest possible diameter to open and allows dust to be more readily placed inside, either in loose form or preferably in cartridge form as above described. Draw string 180 which may weave from inside to outside all around the top of inner bag 156 is then drawn tight and retied. Of course, filling of the inner bag can be accomplished instead after first decoupling it from square 168. Because of the strap connections to a single point at top and their pull up of the bottom central area 165, the dust is leveled and shaped in a ring around area 165, preventing central bag sag.

Inner bag 156 may be formed of as many vertically extending sections or panels as desired. For example bag 156 may be made of two half sections or panels sewn together. However, such a two-piece construction may for some size bags leave the panel width or circumference too great for one or the other of the panels to carry the dust load and hence bag rupture thereof might occur. A more preferred arrangement in such cases is to use more than two panels, especially a four-piece (panel quarters) four-seam construction which reduces the distance between the seams which are stronger because they lap eliminating any rupture.

Thus it has been shown that all of the objects and advantages of this invention heretofore discussed have been carried forth by the construction and operation of the novel livestock dusting applicators above described. Further objects and advantages, and even other embodiments of this application will become apparent to those of ordinary skill in the art upon reading the foregoing disclosure. However, it is to be understood that such modifications and variations are considered to be within the purview and scope of the present invention as defined by the appended claims.

What is claimed is:

1. A protected self-dusting livestock dust applicator comprising:

at least one inner porous storing and dusting bag having a dust filling opening and bottom and side portions for dispensing dust, outer means of flexible weatherproof material substantially overly covering said inner bag and secured therewith and providing skirt means extending substantially below the said bottom portion of said inner bag to allow substantial fold of any portion of said skirt means under said bag to provide protection to said inner bag from use by livestock including mishandling thereby and from foreign matter and moisture, said outer means including adjacent its upper end overlapping outer covers secured to said inner bag around said filling opening with at least a portion of said covers including means for manually fastening and unfastening said outer covers for closing and readily gaining filing access to said inner bag through said filling openings.

2. An applicator as in claim 1 wherein said skirt means is comprised of outer guard flaps respectively positioned on opposite sides of said inner bag and having terminating separate ends extending substantially beyond the ends of said inner bag.

3. An applicator as in claim 1 wherein said skirt means extend below the bottom portion of said inner bag a distance of approximately half the width of the bottom portion of the bag when the bag contains dust.

4. An applicator as in claim 1 wherein said inner porous bag has an inner wall constructed of porous burlap material and an outer wall constructed of porous plastic material.

5. An applicator as in claim 4 wherein said porous plastic material includes a woven polyester material.

6. An applicator as in claim 1 wherein said outer means for flexible waterproof material has an exterior at least in its skirt means portion of heavy flexible, weatherproof cloth-like material that can withstand livestock abuse and protect the inner bag therefrom.

7. An applicator as in claim 1 wherein said inner porous bag has a plurality of walls.

8. An applicator as in claim 7 wherein at least one of said walls is porous plastic material.

9. An applicator as in claim 7 wherein said walls are layers of burlap.

10. An applicator as in claim 1 wherein said outer means includes an inner layer which is at least partially constructed of flexible porous material for receiving dust from said inner bag and assisting said inner bag in the application of dust to said livestock.

11. An applicator as in claim 1 in combination with at least one cartridge of said dust.

12. A protected self-dusting livestock dust applicator comprising:

an inner porous storing and dusting bag having bottom and side portions for dispensing dust and having a top and ends, front and rear covers adjacent said side portions respectively and composed of flexible weatherproof material substantially overly covering said inner bag and secured therewith and providing skirt means extending substantially below the said bottom portion of said inner bag to allow substantial fold of any portion of said skirt means under said bag to provide protection to said inner bag from use by livestock including mishandling thereby and from foreign matter and moisture, said inner bag having an opening in its said top, rope-like hanging means having a horizontal portion, said rear cover being secured to said horizontal portion and extending thereover and downward to overlap the upper portion of said front cover, said inner bag having an opening in its said top adjacent at least a part of said front cover upper portion, and means for fastening said overlapping front and rear covers including means for manually unfastening and refastening at least a section of the front and rear covers including said front cover part for respectively gaining and preventing dust filling access to said inner bag through said opening.

13. An applicator as in claim 12 including a centralized hanging means secured adjacent the top of said rear cover for preventing central sag of said applicator.

14. An applicator as in claim 12 wherein said front and rear covers are secured together at both ends from the top of the applicator downward to a point which is at least halfway and at which point the front and rear covers then are separate guard flaps operating as said skirt means.

15. An applicator as in claim 12 in combination with at least one cartridge of said dust.

16. A protected self-dusting livestock dust applicator comprising:

at least one inner porous storing and dusting bag having a dust filling opening and bottom and side portions for dispensing dust, outer means of flexible weatherproof material substantially overly covering said inner bag and secured therewith and providing skirt means extending substantially below the said bottom portion of said inner bag to allow substantial fold of any portion of said skirt means under said bag to provide protection to said inner bag from use by livestock including mishandling thereby and from foreign matter and moisture, said outer means including opposing outer covers secured to said inner bag around said filling opening and adjacent thereto including means for manually fastening and unfastening said outer covers for closing and readily gaining direct access to said inner bag through said filling openings.

17. An applicator as in claim 16 in combination with at least one cartridge of said dust.

18. A protected self-dusting livestock dust applicator comprising:

at least one inner porous storing and dusting bag having a dust filling opening and bottom and side portions for dispensing dust, outer means of flexible weatherproof material substantially overly covering said inner bag and secured therewith and providing skirt means extending substantially below the said bottom portion of said inner bag to allow substantial fold of any portion of said skirt means under said bag to provide protection to said inner bag from use by livestock including mishandling thereby and from foreign matter and moisture, said outer means including in said flexible weatherproof material an outer filling opening with said material being secured to said inner bag around both said openings and including means for manually fastening and unfastening said outer filling opening for closing and readily gaining direct access to said inner bag through both said filling openings.

19. An applicator as in claim 18 in combination with at least one cartridge of said dust.

20. An applicator as in claim 18 wherein said manually fastening and unfastening means includes pressure adhering fabrics on opposite side of said outer opening and which may be readily separated and closed manually.

* * * * *

UNITED STATES PATENT OFFICE
CERTIFICATE OF CORRECTION

PATENT NO. : 3,902,461

DATED : September 2, 1975

INVENTOR(S) : William C. Cortner, Jr.

It is certified that error appears in the above-identified patent and that said Letters Patent are hereby corrected as shown below:

The front page should be read as though all of item [72] were not present, i.e., all of the following deleted:

"[72] Continuation-in-part of Ser. No. 110,575 Jan. 28, 1971, Pat. No. 3,777,716"

Signed and Sealed this twenty-fifth Day of November 1975

[SEAL]

Attest:

RUTH C. MASON
*Attesting Officer*

C. MARSHALL DANN
*Commissioner of Patents and Trademarks*